United States Patent [19]

Chiba et al.

[11] Patent Number: 4,550,144

[45] Date of Patent: Oct. 29, 1985

[54] PROPYLENE-ETHYLENE COPOLYMERS FOR HIGH-RIGIDITY MOLDED PRODUCTS AND PROCESS FOR PRODUCING THE SAME

[75] Inventors: Hiromasa Chiba; Katsumi Kumahara; Takakiyo Harada; Takahiro Oka; Akihiro Sato, all of Chibaken, Japan

[73] Assignee: Chisso Corporation, Osaka, Japan

[21] Appl. No.: 495,654

[22] Filed: May 18, 1983

[30] Foreign Application Priority Data

May 19, 1982 [JP] Japan ................................. 57-84446

[51] Int. Cl.$^4$ ........................................... C08F 297/08
[52] U.S. Cl. ................................... 525/247; 525/323; 525/270; 525/319; 525/320
[58] Field of Search ............................... 525/247, 323

[56] References Cited

U.S. PATENT DOCUMENTS 4,309,521  1/1982  Sato et al. ........................... 525/247
4,339,557  7/1982  Hasuo et al. ........................ 525/247

Primary Examiner—Wilbert J. Briggs, Sr.
Attorney, Agent, or Firm—Fred Philpitt

[57] ABSTRACT

A propylene-ethylene block copolymer from which molded products having high rigidity and superior high-impact properties can be prepared even without adding any particular additive, is provided, which copolymer is obtained by (i) polymerizing propylene in 70 to 95 weight % based on the total polymerized amount, using a catalyst obtained by reacting an organoaluminum compound (I) or a reaction product of (I) with an electron donor (A), with TiCl$_4$, further reacting the resulting solid product (II) with (A) and an electron acceptor (B), and combining the resulting solid product (III) with an organoaluminum compound (IV) and an aromatic carboxylic acid ester (V), the molar ratio of (V) to (III) being 0.1 to 10.0, and then (ii) polymerizing ethylene or ethylene and propylene in 30 to 5 weight % based on the total polymerized amount, at one or more stages, using the same catalyst as above, the ethylene content being 3 to 20 weight % based on the total polymerized amount.

10 Claims, No Drawings

PROPYLENE-ETHYLENE COPOLYMERS FOR HIGH-RIGIDITY MOLDED PRODUCTS AND PROCESS FOR PRODUCING THE SAME

BACKGROUND OF THE INVENTION

1. Field of the Invention

This invention relates to propylene-ethylene copolymers for high-rigidity molded products and a process for producing the same. More particularly it relates to the copolymers from which molded products having high rigidity and superior high-impact properties at the same time are obtained even without adding any particular additive, and a process for producing the same.

2. Description of the Prior Art

Crystalline polypropylene which will hereinafter be often referred to as polypropylene, as a general-purpose resin, exhibits a high rigidity, hardness, tensile strength, heat-resistance, etc. However, it has such a drawback that it is insufficient in high-impact properties so that its use for molded products which are to be subjected to mechanical impact or used at low temperatures is difficult.

In general, the rigidity, hardness, heat-resistance, etc. of plastic materials have an inconsistent relationship with the high-impact properties thereof, and it often enough is very difficult to improve the formers and the latter at the same time. In order to broaden concrete application fields and hence demand of polypropylene, it is desired to improve not only the high-impact properties, but also the rigidity much more. If these physical properties are improved, it becomes possible to use polypropylene in the application fields where other general-purpose resins such as ABS resin, high-impact polystyrene, etc. have been used.

A number of proposals for improving the high-impact properties of polypropylene have been made. For example, an elastomer represented by ethylene-propylene rubber i.e. EPR is blended with polypropylene. In this case, however, the dispersion of the elastomer is nonuniform as compared with block copolymers so that the weld strength and glossiness of molded products are reduced and also the rigidity is reduced. Further, blending of EPR makes the cost of polypropylene composition higher. Another process wherein propylene is random- or block-copolymerized with another α-olefin such as ethylene for the same purpose as the above-mentioned has been known. The resulting random copolymers are insufficient particularly in the improvement of low-temperature high-impact properties as compared with polypropylene, and as the ethylene content is increased, the rigidity, strength, heat-resistance, etc. lower rapidly. On the other hand, the block copolymers have notably improved values of low-temperature high-impact properties as compared with polypropylene, whereas the rigidity, strength, heat-resistance, etc. are reduced. In order to overcome the above-mentioned drawbacks of the block copolymerization process, a number of processes have been proposed. For example, Japanese patent application laid-open Nos. Sho 50-115296/1975, Sho 52-4588/1977 and Sho 53-35879/1978 disclose a process of carrying out propylene-ethylene block copolymerization at a plurality of stages. Further, Japanese patent publication Nos. Sho 47-8207/1972, Sho 49-13231/1974, Sho 49-13231/1974 and Sho 49-13514/1974 disclose an improved process of adding a third component to catalyst. Still further, Japanese patent application laid-open Nos. Sho 55-764/1980, Sho 54-152095/1979 and Sho 53-29390/1978 and Japanese patent publication No. Sho 55-8011/1980 disclose an improved process of using a specified catalyst. These proposed processes, however, are directed to a technique for alleviation, of making the degree of reduction in the rigidity of the block copolymers as small as possible as compared with polypropylene (homopolymer); thus it has not yet been possible for the block copolymers to have a rigidity value on the same level as or a higher level than that of the homopolymer.

In view of the present status of the known art, the present inventors have made strenuous studies on a propylene-ethylene block copolymer from which molded products having superior high-impact properties and a high rigidity can be obtained without adding any particular additive, as well as a process for producing the same, and as a result have found that such molded products having superior high-impact properties and a high rigidity can be obtained for the first time by using a polypropylene prepared under the defined conditions of the present invention as described below. As apparent from the foregoing, an object of the present invention is to provide a process for producing a propylene-ethylene block copolymer suitable for molding it into molded products having superior high-impact properties and a high rigidity at the same time. Another object of the present invention is to provide a propylene-ethylene block copolymer for high-rigidity molded products.

SUMMARY OF THE INVENTION

The present invention resides in the following two aspects:

First aspect:

(1) A propylene-ethylene block copolymer for high-rigidity molded products, obtained by (i) polymerizing propylene in an amount of 70 to 95% by weight based on the total polymerized amount, in the presence of a catalyst obtained by reacting an organoaluminum compound (I) or a reaction product of an organoaluminum compound (I) with an electron donor (A), with $TiCl_4(C)$, further reacting the resulting solid product (II) with an electron donor (A) and an electron acceptor (B), and combining the resulting solid product (III) with an organoaluminum compound (IV) and an aromatic carboxylic acid ester (V), the molar ratio of said aromatic carboxylic acid ester (V) to said solid product (III) being in the range of 0.1 to 10.0, and then (ii) polymerizing ethylene or ethylene and propylene in an amount of 30 to 5% by weight based on the total polymerized amount, at one or more stages, in the presence of the same catalyst as above, the ethylene content being in the range of 3 to 20% by weight based on the total polymerized amount.

(2) A copolymer according to the item (1) wherein said organoaluminum compound (IV) is a dialkylaluminum monohalide.

(3) A copolymer according to the item (1) wherein said aromatic carboxylic acid ester is at least one member selected from the group consisting of methyl p-toluylate, ethyl p-toluylate, butyl p-toluylate, methyl benzoate, ethyl benzoate, methyl p-anisate and ethyl p-anisate.

(4) A copolymer according to the item (1) wherein said solid product (III) is combined with said organoaluminum compound (IV) and the resulting combination is preactivated with a small amount of an α-olefin and then combined with said aromatic carboxylic acid ester (V) to obtain a catalyst (VII) to be used for said polymerizations.

(5) A copolymer according to the item (1) wherein the second et seq. stage copolymerization is carried out using a polymer mixture obtained at the first stage of the copolymerization, having a relationship of the isotactic pentad ratio (P) of polypropylene therein with its MFR, of $1.00 \geq P \geq 0.015 \log MFR + 0.955$.

Second aspect:

(6) A process for producing a propylene-ethylene block copolymer for high-rigidity molded products, which process comprises (i) polymerizing propylene in an amount of 70 to 95% by weight based on the total polymerized amount, in the presence of a catalyst obtained by reacting an organoaluminum compound (I) or a reaction product of an organoaluminum compound (I) with an electron donor (A), with $TiCl_4$(C), further reacting the resulting solid product (II) with an electron donor (A) and an electron acceptor (B), and combining the resulting solid product (III) with an organoaluminum compound (IV) and an aromatic carboxylic acid ester (V), the molar ratio of said aromatic carboxylic acid ester (V) to said solid product (III) being in the range of 0.1 to 10.0, and then (ii) polymerizing ethylene or ethylene and propylene in an amount of 30 to 5% by weight based on the total polymerized amount, at one or more stages, in the presence of the same catalyst as above, to obtain an ethylene content in the range of 3 to 20% by weight based on the total polymerized amount.

(7) A process for producing a copolymer according to the item (6) wherein said organoaluminum compound (IV) is a dialkylaluminum monohalide.

(8) A process for producing a copolymer according to the item (6) wherein said aromatic carboxylic acid ester is at least one member selected from the group consisting of methyl p-toluylate, ethyl p-toluylate, butyl p-toluylate, methyl benzoate, ethyl benzoate, methyl p-anisate and ethyl p-anisate.

(9) A process for producing a copolymer according to the item (6) wherein said solid product (III) is combined with said organoaluminum compound (IV) and the resulting combination is preactivated with a small amount of an α-olefin and then combined with said aromatic carboxylic acid ester (V) to obtain a catalyst (VII) to be used for said polymerizations.

(10) A process for producing a copolymer according to the item (6) wherein the second et seq. stage copolymerization is carried out using a polymer mixture obtained at the first stage of the copolymerization, having a relationship of the isotactic pentad ratio (P) of polypropylene therein with its MFR, of $1.00 \geq P \geq 0.015 \log MFR + 0.955$.

DESCRIPTION OF THE PREFERRED EMBODIMENTS

Even if the above-mentioned solid product (III) as a catalyst component used in the present invention is replaced by various kinds of titanium trichloride as exemplified below, it is impossible to achieve the object of the present invention:

the so-called A type, H type or AA type titanium trichloride obtained by reducing $TiCl_4$ with metallic Al or hydrogen or by further milling the resulting materials for activation, or a material obtained by supporting $TiCl_4$ on a carrier such as $MgCl_2$, or a material obtained by reducing $TiCl_4$ with an organoaluminum compound, followed merely by heat treatment.

The solid product (III) is prepared as follows:

First, (i) an organoaluminum compound (I) is reacted with $TiCl_4$ (C) or (ii) a reaction product (VI) of the former with an electron donor (A) is reacted with the latter, to prepare a solid product (II). The method (ii) can finally afford a more preferable Ti catalyst component. The method (ii) is disclosed in the specification of Japanese patent application No. Sho 55-12875/1980 (laid-open No. Sho 56-110707/1981) and the contents are as follows:

The reaction of an organoaluminum compound (I) with an electron donor (A) is carried out in a solvent (D) at $-20°$ C. to $+200°$ C., preferably $-10°$ C. to $+100°$ C., for 30 seconds to 5 hours. The addition order of (I), (A) and (D) has no particular limitation, and the proportions of their amounts used are suitably 0.1 to 8 mols, preferably 1 to 4 mols of the electron donor and 0.5 to 5l, preferably 0.5 to 2l, each based on one mol of the organoaluminum compound. The solvent is preferably an aliphatic hydrocarbon. Thus a reaction product (VI) is obtained. It is possible to subject this reaction product (VI) without separating it, that is, at a liquid state after completion of the reaction (such a liquid will hereinafter be often referred to as reaction liquid (VI)), to the following reaction.

The reaction of the reaction product (VI) with $TiCl_4$(C) is carried out at 0° to 200° C., preferably 10° to 90° C. for 5 minutes to 8 hours. It is preferred not to use any solvent, but it is possible to use aliphatic or aromatic hydrocarbons. (VI), (C) and the solvent may be mixed in optional order, and mixing of the total amount is preferably completed within 5 hours. After mixing of the total amount, it is preferred to successively carry out reaction at 10° to 90° C. within 8 hours. As to the respective amounts used for the reaction, 0 to 3,000 ml of the solvent based on one mol of $TiCl_4$ is used, and the reaction product (VI) is used in a ratio of the number of Al atoms in (VI) to the number of Ti atoms in $TiCl_4$, of 0.05 to 10, preferably 0.06 to 0.2. After the reaction, a liquid portion is separated and removed by filtering off or decantation, followed by repeated washings with a solvent. The resulting solid product (II) may be used in a state where it is suspended in a solvent, as it is, in the succeeding step, or may be further dried, taken out in the form of solid matter and used.

The solid product (II) is then reacted with an electron donor (A) and an electron acceptor (B). This reaction may be carried out without any solvent, but a preferable result is obtained by using aliphatic hydrocarbons. The respective amounts used are 10 to 1,000 g, preferably 50 to 200 g of (A), 10 to 1,000 g, preferably 20 to 500 g of (B) and 0 to 3,000 ml, preferably 100 to 1,000 ml of solvent, each based on 100 g of the solid product (II). These 3 or 4 substances are preferably mixed at $-10°$ to $+40°$ C. for 30 seconds to 60 minutes and reacted at 40° to 200° C., preferably 50° to 100° C. for 30 seconds to 5 hours. The mixing order of the solid product (II), (A), (B) and solvent has no particular limitation. (A) may be reacted with (B) in advance of mixing them with the solid product (II), and in this case, (A) is reacted with (B) at 10° to 100° C. for 30 minutes to 2 hours and the resulting material is cooled to 40° C. or lower and used. After the reaction of the solid product (II) with (A) and (B), the reaction mixture is subjected to filtering off or decantation to separate and remove the resulting liquid portion, followed by repeated washings with a solvent to remove unreacted liquid raw materials, whereby a solid product (III) is obtained. This product is dried and taken out in the form of solid matter, or used in a state where it is suspended in a solvent, as it is, in the succeeding step.

The thus obtained solid product (III) is combined with 0.1 to 500 g of an organoaluminum compound based on 1 g of the product (III) and a definite amount of an aromatic carboxylic ester mentioned later, to obtain a catalyst for the present invention, or preferably the product (III) is combined with an organoaluminum compound, the resulting combination is reacted with an α-olefin for preactivation and the above ester is combined with this preactivated material to obtain a catalyst for the present invention.

The organoaluminum compounds (IV) used in the present invention are expressed by the general formula $AlR_nR'_{n'}X_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride; and alkylaluminum halides such as methylaluminum sesquichloride, ethylaluminum sesquichloride, ethylaluminum dichloride, i-butylaluminum dichloride, etc. Besides, alkoxyalkylaluminums such as monoethoxydiethylaluminum, diethoxymonoethylaluminum, etc. may be also used. These organoaluminum compounds may be employed in admixture of two or more kinds. The organoaluminum compound (I) for obtaining the solid product (VI) may be the same as or different from the organoaluminum compound (IV) to be combined with the solid product (III).

As for the electron donors (A) employed in the present invention, various kinds are illustrated below, but preferably ethers are mainly used and other electron donors may be employed together with ethers. As for the electron donors employed, organic compounds containing at least one atom of oxygen, nitrogen, sulfur and phosphorus, such as ethers, alcohols, esters, aldehydes, fatty acids, ketones, nitriles, amines, amides, ureas, thioureas, isocyanates, azo compounds, phosphines, phosphites, phosphinites, thioethers, thioalcohols, etc. Concrete examples are ethers such as diethyl ether, di-n-propyl ether, di-n-butyl ether, di(isoamyl) ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran, and the like; alcohols such as methanol, ethanol, propanol, butanol, pentanol, hexanol, octanol, phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, amines such as methylamine, diethylamine, tributylamine, triethanolamine, β(N,N-dimethylamino)ethanol, pyridine, quinoline, α-picoline, N,N,N',N'-tetramethylhexaethylene diamine, aniline, dimethylaniline and the like; amides such as formamide, hexamethylphosphoric acid triamide, N,N,N',N',N''-pentamethyl-N-β-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azo-compounds such as azobenzene and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like. These electron donors (A) may be used in admixture.

The electron acceptors (B) employed in the present invention are represented by halides of elements of Groups III to VI of the Periodic Table. Concrete examples are anhydrous aluminum, $SiCl_4$, $SnCl_2$, $SnCl_4$, $TiCl_4$, $ZrCl_4$, $PCl_3$, $PCl_5$, $VCl_4$, $SbCl_5$, etc. These may be used in admixture. $TiC_4$ is most preferable.

As the solvent the following are used:

As aliphatic hydrocarbons, n-heptane, n-octane, i-octane, etc. are exemplified. Further, in place of or together with aliphatic hydrocarbons, halogenated hydrocarbons may also be used such as carbon tetrachloride, chloroform, dichloroethane, trichloroethylene, tetrachloroethylene, etc. As aromatic compounds, aromatic hydrocarbons such as naphthalene and their derivatives such as alkyl substitutes e.g. mesitylene, durene, ethylbenzene, isopropylbenzene, 2-ethylnaphthalene, 1-phenylnaphthalene, halogenated compounds e.g. monochlorobenzene, o-dichlorobenzene, etc. are exemplified.

The thus obtained solid product (III) is combined with an organoaluminum compound (IV) and an aromatic ester as described above to obtain a catalyst which is then used for propylene polymerization in conventional manner, or preferably an α-olefin is further reacted with the solid product to obtain a preactivated catalyst which is then used for the polymerization. As the organoaluminum compounds (IV), dialkylaluminum monohalides expressed by the formula $(AlR_1R_2X)$ are preferred. In the formula, $R_1$ and $R_2$ each represent a hydrocarbon group such as alkyl group, aryl group, alkaryl group, cycloalkyl group, etc. or an alkoxy group and X represents a halogen atom of F, Cl, Br or I. Concrete examples are diethylaluminum monochloride, di-n-butylaluminum monochloride, diethylaluminum monoiodide, etc.

For the slurry or bulk polymerization, even a catalyst obtained by combining the solid product (III) with an organoaluminum compound exhibits a sufficient effectiveness, but for the gas phase polymerization, a catalyst having a higher activity, obtained by further reacting an α-olefin for preactivation is preferred. In the case of slurry or bulk polymerization followed by gas phase polymerization, even if the catalyst initially used is the former catalyst, this catalyst has already been reacted with propylene in advance of the gas phase polymerization; hence the catalyst has been changed into the same catalyst as the latter, to exhibit a superior effectiveness.

For the preactivation, it is preferred that an α-olefin be reacted using 0.1 to 500 g of an organoaluminum compound, 0 to 50 l of a solvent, to 1,000 ml of hydrogen and 0.05 to 5,000 g, preferably 0.05 to 3,000 g of an α-olefin, each based on 1 g of the solid product (III) at 0° to 100° C. for one minute to 20 hours to have 0.01 to 2,000 g, preferably 0.05 to 200 g of the α-olefin reacted based on 1 g of the solid product (III).

The reaction of an α-olefin for the preactivation may be carried out either in an aliphatic or aromatic hydrocarbon solvent or in a liquefied α-olefin such as liquefied propylene, liquefied butene-1, etc. without using any solvent, or ethylene, propylene or the like may be reacted in gas phase. Further it is also possible to carry out the preactivation in the coexistence of an α-olefin polymer prepared in advance or hydrogen.

The method for the preactivation includes various embodiments such as (1) a method wherein a catalyst obtained by combining the solid product (III) with an organoaluminum compound is contacted with an α-olefin and the resulting catalyst is used for the slurry, bulk or gas phase reaction; (2) a method wherein the solid product (III) is combined with an organoaluminum compound in the presence of an α-olefin; (3) a method wherein an α-olefin polymer is made coexistent in the methods (1) or (2); (4) a method wherein hydrogen is made coexistent in the methods (1), (2) or (3); etc. In the preactivation, it is also possible to add an aromatic ester (V) in advance.

Examples of α-olefins used for the preactivation are straight chain monoolefins such as ethylene, propylene, butene-1, hexene-1, heptene-1, etc., branched chain monoolefins such as 4-methyl-pentene-1, 2-methyl-pentene-1, 3-methyl-butene-1, etc., styrene, etc. These α-olefins may be the same as or different from those to be polymerized, or may be used in admixture.

After the preactivation, the solvent, the organoaluminum compound and unreacted α-olefin may be removed by distilling off under reduced pressure or the like means to use the resulting material in the form of dry powder for polymerization; or the powder may be used in a state where it is suspended in a solvent within a range of 80 l or less based on 1 g of the solid product (III); or the solvent, unreacted α-olefin and the organoaluminum compound may be removed by filtering off or decantation or dried to use the resulting material in the form of powder. Further it is also possible to add an organoaluminum compound in advance of polymerization.

The thus obtained preactivated catalyst can be used for slurry polymerization wherein propylene is polymerized in a hydrocarbon solvent such as n-hexane, n-heptane, n-octane, benzene, toluene, etc. or bulk polymerization carried out in a liquefied propylene, or gas phase polymerization, and in order to raise the isotacticity of the resulting propylene polymers, it is necessary to add an aromatic carboxylic acid ester (V) (hereinafter abbreviated to aromatic ester) to the catalyst (III) in a molar ratio of (V)/(III) of 0.1 to 10.0. If the amount of the aromatic ester added is less, improvement in the isotacticity is insufficient, while if it is too large, the catalyst activity is reduced; hence such amounts are not practical. Concrete examples of the aromatic esters are ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc. The molar ratio (Al/Ti) of the organoaluminum compound (IV) to the solid product (III) is 0.1 to 100, preferably 1 to 20. In this case the number of mols of the solid product (III) refers to substantially the number of g atoms of Ti in (III). As for the crystallinity of polymer capable of exhibiting the effectiveness of the present invention, the isotactic pentad ratio (P) of polypropylene obtained by the first stage propylene polymerization for the production of propylene-ethylene block copolymers falls in the range of $1 \geq P \geq 0.015$ log MFR + 0.955 in relation to MFR. Higher MFR tends to make P higher. MFR usually falls in the range of 0.05 to 100. The polymerization temperature usually is in the range of 20° to 100° C., preferably 40° to 85° C. Too low temperatures are not practical since the catalyst activity is reduced, while higher temperatures make it difficult to elevate isotactity. The polymerization is carried out under a pressure in the range of ordinary pressure to 50 kg/cm$^2$G, and usually for about 30 minutes to 15 hours. In the polymerization, addition of hydrogen in an adequate amount and the like means are the same as those in conventional polymerization processes.

The propylene-ethylene block copolymerization of the present invention may be carried out in any form of slurry polymerization wherein an inert solvent such as propane, hexane, heptane, etc. is used, bulk polymerization carried out in liquefied propylene or gas phase polymerization carried out in gaseous propylene. In the first stage propylene polymerization, as far as the resulting polymer can maintain the above-mentioned P values, it is possible to use an α-olefin such as ethylene, 1-butene, 4-methyl-pentene-1, etc. in an amount of 1% by weight or less together with propylene. However, in order to keep the rigidity of the block copolymers of the present invention at a high value, propylene homopolymerization is preferable and easily carried out. In the first stage polymerization, propylene is polymerized in an amount of 70 to 95% by weight based on the total amount of polymer obtained by the first, second et seq stage polymerizations (excluding soluble polymers). In the second et seq stage polymerizations, ethylene or ethylene and propylene are polymerized at one stage or more. One stage referred to in this case means one section of a continuous or temporary feed of these monomers. In the second et seq stage polymerizations, ethylene or ethylene and propylene are polymerized in an amount of 30 to 5% by weight based on the above-mentioned total amount of polymer. However, the ethylene content in the finally obtained polymer (excluding soluble polymers dissolved out into a solvent) should be in the range of 3 to 20% by weight. Thus, if propylene alone is polymerized at the first stage in an amount of 70% by weight (hereinafter abbreviated to %) based on the total amount of polymer obtained by the first, second et seq stage polymerizations, then the amount of ethylene to be polymerized at the second stage is restricted to 20% or less; hence in this case, as for the balance 10% or less, propylene or propylene and another α-olefin within an allowable range for the percentage should be block-polymerized. However, if propylene is polymerized in an amount of 80% at the first stage, ethylene alone may be polymerized in an amount of 20% at the second stage. As described above, as far as the amount of ethylene polymerized at the stage where it is polymerized and the ethylene content in the total amount of polymer obtained at the first, second et seq stage polymerizations are respectively within a definite range, ethylene alone or in admixture with propylene or another α-olefin may be used at one stage or a plurality of stages to carry out the block copolymerization of the present invention. Examples of the above-mentioned another α-olefin used in admixture with ethylene at the second et seq stage are 1-butene, 1-hexene, 4-methylpentene-1, styrene and divinylbenzene.

Since the propylene-ethylene block copblymers of the present invention are superior in the rigidity and high-impact properties to known corresponding products, it is possible to use them in application fields to which various molding methods have been applied, to exhibit their specific properties. Particularly in the fields of injection molding, it has become possible to extend the application fields of polypropylene as far as the fields of molded products of superior rigid or high-impact resins to which fields high-impact polystyrene, ABS resin, etc. have so far been applied, but polypropylene has so far been impossible to apply, and also it has become possible to improve the quality of polypropylene molded products and further to reduce the thickness thereof. As to this thickness reduction, it is possible to expect not only an effectiveness of resources-saving but also cost reduction due to improvement in the molding speed.

If a composition having a nucleus-creating agent or an inorganic filler blended with the copolymers of the present invention is used, it is possible to produce molded products having well-balanced high rigidity and superior high-impact properties which have been impossible to obtain from conventional polypropylene compositions.

The present invention will be further described by way of Examples in more detail, but it is not intended to be limited thereby. In addition, measurements of various physical properties described in Examples and Comparative examples were carried out according to the following methods:

Methods for measuring physical properties of injection-molded products:
Bending modulus: JIS K 6758 (Kgf/cm$^2$)
Bending strength: JIS K 6758 (Kgf/cm$^2$)
Tensile strength: JIS K 6758 (Kgf/cm$^2$)
Hardness (Rockwell): JIS K 6758 (R-scale)
Heat deformation temperature (HDT): JIS K 7202 (°C.)
Izod impact strength (II): JIS K 6758 (Kgf cm/cm$^2$)
Ethylene content: Infrared absorption spector method
MFR: ASTM D-1238 (g/10 minutes), 230° C., 2.16 kg
Isotactic pentad ratio (P):
Isotactic ratio in terms of pentad units in polypropylene molecular chain. Measured using $^{13}$C-NMR based on Macromelecules, 8, 687 (1975).

EXAMPLE 1

(1) Preparation of catalyst n-Hexane (600 m ), diethylaluminum monochloride (DEAC)(0.50 mol) and diisoamyl ether (1.20 mol) were mixed at 25° C. for one minute, followed by reaction at the same temperature for 5 minutes to obtain a reaction liquid (VI) (molar ratio of diisoamyl ether/DEAC: 2.4). TiCl$_4$ (4.0 mols) was placed in a nitrogen-purged reactor and heated to 35° C., followed by dropwise adding thereto the total amount of the above-mentioned reaction liquid (VI) over 180 minutes, keeping the mixture at the same temperature as above for 30 minutes, raising the temperature up to 75° C., further reacting for one hour, cooling down to room temperature to remove the supernatant and four times repeating a procedure of adding n-hexane (4,000 ml) and removing the supernatant by decantation, to obtain a solid product (II) (190 g). The total amount of this product (II) was suspended in n-hexane (3,000 ml) and to the resulting suspension were added diisoamyl ether (160 g) and TiCl$_4$ (350 g) at room temperature (20° C.) over about one minute, followed by reacting the mixture at 65° C. for one hour, thereafter cooling down to room temperature (20° C.), removing the supernatant by decantation, five times repeating a procedure of adding n-hexane (4,000 ml), stirring for 10 minutes and still standing to remove the supernatant, and drying under reduced pressure to obtain a solid product (III).

(2) Preparation of Preactivated Catalyst

A 20 l capacity stainless reactor equipped with slant blades was purged with nitrogen gas, and to this reactor were added n-hexane (15 l), diethylaluminum monochloride (42 g) and the solid product (III) (30 g) at room temperature, followed by introducing hydrogen (15 Nl), reacting the mixture under a propylene partial pressure of 5 kg/cm$^2$G for 5 minutes and removing unreacted propylene, hydrogen and n-hexane under reduced pressure to obtain a preactivated catalyst (VII) in the form of powder (reacted propylene per g of the solid product (III): 82.0 g).

(3) Propylene-Ethylene Block Copolymerization

A 400 l capacity stainless polymerization vessel equipped with turbine type agitating blades was purged with nitrogen gas, and into this vessel were fed n-hexane (250 l), and then diethylaluminum monochloride (10 g), the above-mentioned preactivated catalyst (VII) (10 g) and methyl p-toluylate (11.0 g), and further there was added hydrogen so as to keep a concentration in the gas phase of 6% by mol, followed by raising the temperature up to 70° C., then feeding propylene, raising the total pressure up to 10 kg/cm$^2$G, continuing polymerization for 4 hours at 70° C. and 10 kg/cm$^2$G, stopping the propylene feed, releasing unreacted propylene, collecting a portion of the slurry in the polymerization vessel, and filtering off, washing and drying the portion to obtain polypropylene powder, which had a MFR of 11.5 and an isotactic pentad ratio of 0.982.

After releasing unreacted propylene, while the inside of the polymerization vessel was kept at 60° C. and 0.1 kg/cm$^2$G, ethylene and propylene as the raw materials for the second stage polymerization were continuously fed for 2 hours so as to give a proportion of ethylene fed of 33% by weight. The total amount of ethylene fed was 2.4 kg. During the polymerization, hydrogen was fed so as to give an ethylene concentration in the gas phase, of 8% by mol. After polymerization for 2 hours, the feed of ethylene and propylene was stopped and unreacted ethylene and propylene were released. Methanol (25 l) was then fed into the polymerization vessel and the temperature was raised up to 75° C. After 30 minutes, a 20% aqueous solution (100 g) of NaOH was further added and the mixture was agitated for 20 minutes, followed by adding purified water (100 l), discharging remaining propylene, withdrawing the aqueous layer, further adding purified water (100 l), washing with water with stirring for 10 minutes, withdrawing the aqueous layer, further withdrawing the resulting polypropylene-n-hexane slurry, filtering and drying to obtain polypropylene powder.

(4) Production of injection-molded product

To the polypropylene powder (4.0 kg) obtained in the above item (3) were added a phenolic heat-stabilizer (0.004 kg) and calcium stearate (0.004 kg) and they were mixed by means of a high-speed agitation type mixer (Henschel mixer, tradename) at room temperature for 10 minutes, followed by granulating the mixture by means of an extrusion-granulator having a screw diameter of 40 mm, molding the resulting granules by an injection molding machine at a molten resin temperature of 230° C. and a die temperature of 50° C., into a JIS type test piece, conditioning this test piece inside a room under a humidity of 50% and at room temperature (23° C.), for 72 hours, and measuring the values of its physical properties. The values are listed in Table 1-2 shown below.

EXAMPLES 2 AND 3

Example 1 was repeated except that the hydrogen concentration in the gas phase at the first stage was varied to 8% by mol (Example 2) or 10% by mol (Example 3) and the amount of ethylene fed at the second stage was varied to 5.4 kg (Example 2) or 8.8 kg (Example 3). The polymerization conditions and results are shown in Table 1.

Comparative Example 1

Example 1 was repeated except that the preactivated catalyst (VII) was replaced by a commercially available catalyst (AA type) (30 g) obtained by reducing $TiCl_4$ with metallic aluminum followed by milling activation, and the first stage polymerization alone was carried out. The polymerization conditions and results are shown in Table 1.

Comparative Examples 2, 3 and 5

Example 1 (Comparative example 2), Example 2 (Comparative example 3) and Example 3 (Comparative example 5) were respectively repeated except that the catalyst used in Comparative example 1 was used. The polymerization conditions and results are shown in Table 1 (Comparative examples 2 and 3) and Table 2 (Comparative example 5).

Comparative Example 4

Example 2 was repeated except that the catalyst used in Comparative example 1 was used, methyl p-toluylate (33 g) was added and the amount of ethylene fed at the second stage was varied to 3.0 kg. The polymerization conditions and results are shown in Table 2.

TABLE 1-1

| | | Polymerization conditions | | | | | |
|---|---|---|---|---|---|---|---|
| | | Example | | | Comparative example | | |
| | | 1 | 2 | 3 | 1 | 2 | 3 |
| (Catalyst) | | | | | | | |
| No. or type of solid product | | VII | same as left | | AA | same as left | |
| Organoaluminum compound | | DEAC | same as left | | | same as left | |
| Additive | | MPT* | same as left | | | none | |
| Conditions of first stage polymerization | | | | | | | |
| Gas phase $H_2$ | % by mol | 6 | 8 | 10 | 3 | 3 | 4 |
| Polymerization time | hrs | 4 | 4 | 4 | 4 | 4 | 4 |
| Conditions of second stage polymerization | | | | | | | |
| Gas phase $H_2$ | % by mol | 8 | 8 | 8 | — | 8 | 8 |
| Ethylene/total monomers | % by wt. | 33 | 33 | 33 | — | 33 | 33 |
| Polymerization time | hrs | 2 | 2 | 2 | — | 2 | 2 |

*Methyl p-toluylate

TABLE 1-2

| | | Polymerization results | | | | | |
|---|---|---|---|---|---|---|---|
| | | Example | | | Comparative example | | |
| | | 1 | 2 | 3 | 1 | 2 | 3 |
| First stage polymer | | | | | | | |
| MFR | g/10 min. | 11.5 | 19.0 | 26.0 | 11.0 | 12.2 | 18.5 |
| Isotactic pentad ratio | (P) | 0.982 | 0.979 | 0.985 | 0.934 | 0.938 | 0.941 |
| Final polymer Yield | Kg | 45.2 | 50.3 | 54.4 | 41.5 | 44.7 | 49.8 |
| MFR | g/10 min. | 8.5 | 9.0 | 7.7 | 11.0 | 8.8 | 8.1 |
| $TC_2^=$ | %* | 4.2 | 8.5 | 12.1 | — | 4.5 | 8.3 |
| $RC_2^=$ | %** | 62 | 60 | 62 | — | 61 | 62 |
| Bending modulus | $10^4$ Kg/cm$^2$ | 1.85 | 1.53 | 1.42 | 1.36 | 1.21 | 1.16 |

TABLE 1-2-continued

|  |  | Polymerization results | | | | | |
|---|---|---|---|---|---|---|---|
|  |  | Example | | | Comparative example | | |
|  |  | 1 | 2 | 3 | 1 | 2 | 3 |
| Bending strength | Kg/cm² | 526 | 458 | 381 | 372 | 365 | 354 |
| Tensile strength | Kg/cm² | 397 | 384 | 353 | 346 | 337 | 305 |
| HDT | °C. | 129 | 115 | 106 | 105 | 103 | 100 |
| II | Kgf cm/cm² | 5.6 | 8.4 | 12.8 | 3.2 | 5.7 | 8.1 |
| Hardness | R-scale | 112 | 105 | 101 | 104 | 96 | 91 |

Note:
*Ethylene content in the total polymer (% by wt.) (this also applies to Tables 2 et seq.)
**Ethylene content in a portion obtained by the second stage polymerization (% by wt.) (this also applies to Tables 2 et seq.)

As apparent from Table 1, even when the catalyst component of the present invention is replaced by TiCl₃ (AA), it is impossible to obtain a block copolymer having a high rigidity. This fact is unchanged even when the same additive (MPT) as in Examples 1~3 is used at the same time with the TiCl₃ (AA) (see Table 2 and Comparative example 4). Further, surprisingly the block copolymers of the present invention have higher rigidity values than that of propylene homopolymer (Comparative example 1).

Comparative Example 6

Anhydrous MgCl₂ (20 g), ethyl benzoate (10 ml) and methylpolysiloxane (6.0 ml) were milled in a ball mill for 100 hours. The resulting solid product (15 g) was suspended in TiCl₄ (200 ml), followed by agitating the suspension at 80° C. for 2 hours, filtering off the liquid, washing with n-hexane till no TiCl₄ was detected in the filtrate and drying to obtain a solid catalyst. Example 2 was then repeated except that this solid product (10 g) was used in place of the preactivated catalyst of Example 1 and also TEA (10 g) was used in place of DEAC. The results are shown in Table 2. As apparent from Table 2, the supported type catalyst of the instant Comparative example could not afford any high rigidity which is a main effectiveness of the present invention.

Comparative Example 7

In the preparation of the solid product (II) of Example 1, DEAC (0.5 mol) was used in place of the reaction liquid (VI), and dropwise added as in Example 1, but at 0° C. in place of 35° C., followed by raising the temperature up to 75° C., further reacting with stirring for one hour, then refluxing at a boiling temperature of TiCl₄ (about 136° C.) for 4 hours to turn the color to violet, cooling, washing with n-hexane, filtering and drying as in Example 1 to obtain a solid catalyst. Comparative example 4 was then repeated except that this solid catalyst was used in place of the catalyst (AA) of Comparative example 2. The results are shown in Table 2. In this case, too, the resulting polymer was inferior in the overall rigidity to the polymer of Example 2.

TABLE 2-1

|  |  | Polymerization conditions | | | | | |
|---|---|---|---|---|---|---|---|
|  |  | Comparative example | | | | Example | |
|  |  | 4 | 5 | 6 | 7 | 4 | 5 |
| (Catalyst) | | | | | | | |
| No. or type of solid product |  | AA | same as left | Supported type | Reduced type | VII | same as left |
| Organoaluminum compound |  | DEAC | same as left | TEA | DEAC | same as left | |
| Additive | Kind | MPT | — | — | | | |
|  | Mol ratio* | 1.0 | — | — | 1.0 | 0.2 | 2.0 |
| (Conditions of first stage polymerization) | | | | | | | |
| Gas phase H₂ | % by mol | 7 | 5 | 4 | 8 | 5 | 10 |
| Polymerization time | hrs | 4 | 4 | 3 | 4 | 4 | 4 |
| (Conditions of second stage polymerization) | | | | | | | |
| Gas phase H₂ | % by mol | 8 | 8 | 8 | 8 | 8 | 8 |
| Ethylene/total monomers | % by wt. | 33 | 33 | 33 | 33 | 33 | 33 |
| Polymerization time | hrs | 2 | 2 | 2 | 2 | 2 | 2 |

Note:
*Additive/solid product (or AA)

TABLE 2-2

|  |  | Polymerization results | | | | | |
|---|---|---|---|---|---|---|---|
|  |  | Comparative example | | | | Example | |
|  |  | 4 | 5 | 6 | 7 | 4 | 5 |
| First stage polymer | | | | | | | |
| MFR | g/10 min. | 17.8 | 26.5 | 21.3 | 16.7 | 15.4 | 18.2 |
| Isotactic pentad ratio | (P) | 0.950 | 0.944 | 0.925 | 0.952 | 0.976 | 0.988 |
| Final polymer Yield | Kg | 28.6 | 51.5 | 47.5 | 51.7 | 45.2 | 40.5 |
| MFR | g/10 min. | 8.6 | 8.2 | 9.6 | 8.4 | 7.5 | 8.3 |
| TC₂= | % | 8.2 | 12.5 | 7.8 | 8.3 | 8.5 | 8.2 |

TABLE 2-2-continued

| | | Polymerization results | | | | | |
|---|---|---|---|---|---|---|---|
| | | Comparative example | | | | Example | |
| | | 4 | 5 | 6 | 7 | 4 | 5 |
| $RC_2^=$ | % | 63 | 62 | 58 | 60 | 61 | 62 |
| Bending modulus | $10^4$ Kg/cm$^2$ | 1.24 | 1.05 | 0.98 | 1.35 | 1.48 | 1.62 |
| Bending strength | Kg/cm$^2$ | 376 | 338 | 317 | 385 | 434 | 469 |
| Tensile strength | Kg/cm$^2$ | 342 | 285 | 285 | 340 | 365 | 372 |
| HDT | °C. | 104 | 95 | 89 | 106 | 110 | 118 |
| II | Kgf cm/cm$^2$ | 8.0 | 12.6 | 7.8 | 8.1 | 8.7 | 8.4 |
| Hardness | R-scale | 95 | 87 | 85 | 97 | 108 | 107 |

EXAMPLES 4, 5 AND 6

Comparative Examples 8, 9 and 10

In Example 2, the amount of methyl p-toluylate used was varied as listed in Tables 2 and 3. In addition, in each of Comparative examples 8 and 9 and Example 4, the preactivated catalyst component (VII) was used in an amount of 6 g. Further, as to the total amount of ethylene fed in the second stage polymerization, ethylene was fed so as to give a $TC_2=\%$ (see Table 1-2) of about 8%, correspondingly to the amount of the final polymer formed. The main polymerization conditions and results are shown in Table 2 (Example 4) and Table 3. As apparent from these Tables, if the molar ratio of aromatic ester/solid product (VII) used in the polymerization is less than 0.05, improvement in the rigidity of the resulting block copolymers is insufficient. On the other hand, in Comparative example 10 wherein the molar ratio greatly exceeded 10.0, the rigidity of the resulting polymer is high, but its catalyst activity is reduced to a large extent; hence the resulting polymer is inferior in this respect.

EXAMPLES 7, 8 AND 9

Example 1 was repeated except that DEAC was replaced by each of the following organic aluminum compounds a~c:

a: Di-n-propylaluminum monochloride (Example 7)
b: Di-i-butylaluminum monochloride (Example 8)
c: Diethylaluminum monoiodide (Example 9)

The polymerization conditions and results are shown in Table 3. As apparent from this Table, almost the same results as those of Example 1 were obtained in these Examples with regard to both the yield and physical properties.

TABLE 3-1

| | | Polymerization conditions | | | | | | |
|---|---|---|---|---|---|---|---|---|
| | | Comparative example | | | Example | | | |
| | | 8 | 9 | 10 | 6 | 7 | 8 | 9 |
| (Catalyst) | | | | | | | | |
| No. or type of solid product | | VII | same as left | | same as left | same as left | | |
| Organoaluminum compound* | | DEAC | same as left | | same as left | a | b | c |
| Additive Kind | | MPT | same as left | | same as left | | | |
| Mol ratio | | 0 | 0.05 | 13 | 7.0 | 1.0 | 1.0 | 1.0 |
| (Conditions of first stage polymerization) | | | | | | | | |
| Gas phase H$_2$ | % by mol | 4 | 4 | 15 | 12 | 6 | 6 | 6 |
| Polymerization time | hrs | 4 | 4 | 4 | 4 | 4 | 4 | 4 |
| (Conditions of second stage polymerization) | | | | | | | | |
| Gas phase H$_2$ | % by mol | 8 | 8 | 8 | 8 | 8 | 8 | 8 |
| Ethylene/total monomers | % by wt. | 33 | 33 | 33 | 33 | 33 | 33 | 33 |
| Polymerization time | hrs | 2 | 2 | 2 | 2 | 2 | 2 | 2 |

Note
*a, b and c are compounds indicated in Examples 7 and 8.

TABLE 3-2

| | | Polymerization results | | | | | | |
|---|---|---|---|---|---|---|---|---|
| | | Comparative example | | | Example | | | |
| | | 8 | 9 | 10 | 6 | 7 | 8 | 9 |
| First stage polymer | | | | | | | | |
| MFR | g/10 min. | 20.5 | 18.2 | 18.6 | 19.1 | 12.1 | 13.6 | 10.4 |
| Isotactic pentad ratio | (P) | 0.936 | 0.954 | 0.978 | 0.982 | 0.977 | 0.976 | 0.986 |
| Final polymer Yield | Kg | 52.6 | 52.1 | 5.2 | 16.5 | 46.1 | 43.5 | 41.4 |
| MFR | g/10 min. | 9.5 | 8.3 | 7.8 | 9.2 | 8.8 | 9.5 | 7.6 |
| $TC_2^=$ | % | 7.7 | 7.9 | 9.1 | 8.9 | 4.5 | 4.8 | 5.1 |
| $RC_2^=$ | % | 61 | 60 | 63 | 62 | 63 | 62 | 64 |
| Bending modulus | $10^4$ Kg/cm$^2$ | 1.10 | 1.31 | 1.54 | 1.56 | 1.82 | 1.78 | 1.88 |
| Bending strength | Kg/cm$^2$ | 337 | 376 | 442 | 458 | 515 | 509 | 534 |
| Tensile strength | Kg/cm$^2$ | 306 | 334 | 357 | 363 | 387 | 380 | 407 |

TABLE 3-2-continued

|  |  | Comparative example | | | Example | | | |
|---|---|---|---|---|---|---|---|---|
|  |  | 8 | 9 | 10 | 6 | 7 | 8 | 9 |
| HDT | °C. | 92 | 103 | 112 | 114 | 119 | 121 | 128 |
| II | Kgf cm/cm$^2$ | 7.6 | 7.8 | 9.2 | 9.1 | 5.3 | 4.9 | 6.2 |
| Hardness | R-scale | 88 | 92 | 101 | 102 | 108 | 109 | 115 |

EXAMPLES 10~15

Example 1 was repeated except that MPT was replaced by the following aromatic esters d~i, each in a definite amount:

| d: Ethyl p-toluylate | 12.0 g (Example 10) |
|---|---|
| e: Butyl p-toluylate | 14.0 g (Example 11) |
| f: Methyl benzoate | 10.0 g (Example 12) |
| g: Ethyl benzoate | 11.0 g (Example 13) |
| h: Methyl p-anisate | 12.0 g (Example 14) |
| i: Ethyl p-anisate | 13.0 g (Example 15) |

The polymerization conditions and results are shown in Table 4. As apparent from this Table, almost the same results as those of Example 1 were obtained in these Examples with regard to both the yield and physical properties.

EXAMPLES 16~18

Example 2 was repeated except that the proportion of ethylene/total monomers fed in the second stage polymerization was varied to 22, 50 or 80% by weight. The polymerization conditions and results are shown in Table 5.

TABLE 5-1

|  |  | Polymerization conditions | | |
|---|---|---|---|---|
|  |  | Example | | |
|  |  | 16 | 17 | 18 |
| (Catalyst) |  |  |  |  |
| No. or type of solid product |  |  | VII | same as left |
| Organoaluminum compound |  |  | DEAC | same as left |
| Additive | Kind | | MPT | same as left |
|  | Mol ratio | | 1.0 |  |
| (Conditions of first stage polymerization) | | | | |

TABLE 4-1

|  |  | Polymerization conditions | | | | | |
|---|---|---|---|---|---|---|---|
|  |  | Example | | | | | |
|  |  | 10 | 11 | 12 | 13 | 15 | 15 |
| (Catalyst) |  |  |  |  |  |  |  |
| No. or type of solid product |  | VII | | same as left | | | |
| Organoaluminum compound |  | DEAC | | same as left | | | |
| Additive | Kind* | d | e | f | g | h | i |
|  | Mol ratio | 1.0 | | | same as left | | |
| (Conditions of first stage polymerization) | | | | | | | |
| Gas phase H$_2$ | % by mol | 6 | 6 | 6 | 6 | 6 | 6 |
| Polymerization time | hrs | 4 | 4 | 4 | 4 | 4 | 4 |
| (Conditions of second stage polymerization) | | | | | | | |
| Gas phase H$_2$ | % by mol | 8 | 8 | 8 | 8 | 8 | 8 |
| Ethylene/total monomers | % by wt. | 33 | 33 | 33 | 33 | 33 | 33 |
| Polymerization time | hrs | 2 | 2 | 2 | 2 | 2 | 2 |

Note:
*d~i are compounds indicated in Examples 10~15.

stage polymerization

TABLE 4-2

|  |  | Polymerization results | | | | | |
|---|---|---|---|---|---|---|---|
|  |  | Example | | | | | |
|  |  | 10 | 11 | 12 | 13 | 14 | 15 |
| First stage polymer |  |  |  |  |  |  |  |
| MFR | g/10 min. | 13.1 | 12.8 | 13.6 | 14.2 | 13.5 | 13.7 |
| Isotactic pentad ratio | (P) | 0.981 | 0.980 | 0.976 | 0.979 | 0.982 | 0.980 |
| Final polymer Yield | Kg | 41.3 | 39.2 | 35.9 | 36.6 | 44.3 | 42.6 |
| MFR | g/10 min. | 9.2 | 8.4 | 8.7 | 9.5 | 9.0 | 9.3 |
| TC$_2$= | % | 4.7 | 5.4 | 5.8 | 5.5 | 4.2 | 4.6 |
| RC$_2$= | % | 61 | 62 | 64 | 63 | 60 | 61 |
| Bending modulus | 10$^4$ Kg/cm$^2$ | 1.80 | 1.75 | 1.72 | 1.73 | 1.82 | 1.76 |
| Bending strength | Kg/cm$^2$ | 511 | 503 | 482 | 485 | 520 | 497 |
| Tensile strength | Kg/cm$^2$ | 384 | 379 | 368 | 372 | 396 | 384 |
| HDT | °C. | 125 | 119 | 117 | 120 | 125 | 123 |
| II | Kgf cm/cm$^2$ | 5.8 | 6.5 | 6.8 | 6.2 | 4.8 | 5.5 |
| Hardness | R-scale | 108 | 105 | 105 | 106 | 112 | 110 |

TABLE 5-1-continued

| Polymerization conditions | | Example | | |
|---|---|---|---|---|
| | | 16 | 17 | 18 |
| Gas phase $H_2$ | % by mol | 8 | 8 | 8 |
| Polymerization time | hrs. | 4 | 4 | 4 |
| (conditions of second stage polymerization) | | | | |
| Gas phase $H_2$ | % by mol | 6 | 9 | 10 |
| Ethylene/total monomers | % by wt. | 22 | 50 | 80 |
| Polymerization time | hrs. | 2 | 2 | 2 |

TABLE 5-2

| Polymerization results | | Example | | |
|---|---|---|---|---|
| | | 16 | 17 | 18 |
| First stage polymer | | | | |
| MFR | g/10 min. | 20.6 | 18.6 | 20.8 |
| Isotactic pentad ratio | (P) | 0.984 | 0.982 | 0.985 |
| Final polymer Yield | Kg | 45.3 | 52.5 | 53.4 |
| MFR | g/10 min. | 9.8 | 8.6 | 8.6 |
| $TC_2^=$ | % | 7.6 | 8.5 | 8.6 |
| $RC_2^=$ | % | 51 | 72 | 90 |
| Bending modulus | $10^4$ Kg/cm$^2$ | 1.67 | 1.89 | 1.96 |
| Bending strength | Kg/cm$^2$ | 475 | 541 | 565 |
| Tensile strength | Kg/cm$^2$ | 364 | 396 | 397 |
| HDT | °C. | 110 | 128 | 134 |
| II | Kgf cm/cm$^2$ | 10.6 | 7.9 | 6.4 |
| Hardness | R-scale | 101 | 108 | 113 |

As apparent from Table 5, even when the proportion of ethylene in the olefins used at the second stage is increased within the range of the present invention, the physical properties of the resulting block copolymers are superior and their yields are not reduced so much.

EXAMPLES 19 AND 20

Comparative Examples 11 and 12

These Examples and Comparative examples were carried out in the same manner as in Examples 1 and 2 and Comparative examples 2 and 3, respectively, except that p-t-butylbenzoic acid aluminum salt (0.016 Kg) as a nucleus-creating agent was added at the time of granulation.

| Example or Comparative example | Corresponding Example or Comparative example |
|---|---|
| Example 19 | Example 1 |
| Example 20 | Example 2 |
| Compar. ex. 11 | Compar. ex. 2 |
| Compar. ex. 12 | Compar. ex. 3 |

The polymerization results and the physical properties of the resulting compositions are shown in Table 6.

TABLE 6

Polymerization results and physical properties of compositions

| | | Example | | Compar. ex. | | Example | Compar. ex. |
|---|---|---|---|---|---|---|---|
| | | 19 | 20 | 11 | 12 | 21 | 13 |
| First stage polymer | | | | | | | |
| MFR | g/10 min. | 11.5 | 19.0 | 12.2 | 18.5 | 19.0 | 18.5 |
| Isotactic pentad ratio | (P) | 0.982 | 0.979 | 0.938 | 0.941 | 0.979 | 0.941 |
| Final polymer Yield | Kg | 45.2 | 50.3 | 44.7 | 49.8 | 50.3 | 49.8 |
| MFR | g/10 min. | 8.4 | 8.7 | 8.5 | 7.8 | 9.0 | 8.1 |
| $TC_2^=$ | % | 4.2 | 8.5 | 4.5 | 8.3 | 8.5 | 8.3 |
| $RC_2^=$ | % | 62 | 60 | 61 | 62 | 60 | 62 |
| Bending modulus | $10^4$ Kg/cm$^2$ | 2.16 | 1.85 | 1.50 | 1.43 | 2.16 | 2.20 |
| Bending strength | Kg/cm$^2$ | 552 | 527 | 438 | 415 | 446 | 348 |
| Tensile strength | Kg/cm$^2$ | 415 | 396 | 364 | 352 | — | — |
| HDT | °C. | 132 | 127 | 115 | 108 | 126 | 122 |
| II | Kgf cm/cm$^2$ | 5.2 | 8.0 | 5.4 | 7.8 | 8.1 | 7.4 |
| Hardness | R-scale | 114 | 111 | 105 | 103 | — | — |

As apparent from Table 6, the block copolymers of the present invention have their rigidity more improved by adding a nucleus-creating agent, whereas those of the Comparative examples also have their rigidity improved by its addition, but are far inferior to the products of the present invention having the nucleus-creating agent added.

EXAMPLE 21

Comparative Example 13

These Example and Comparative example were carried out in the same manner as in Example 2 and Comparative example 3, respectively, except that talc (400 g (10 parts) or 800 g (20 parts)) was added at the time of granulation.

| Example or Comparative example | Amount of talc added (g) | Corresponding Example or Comparative example |
|---|---|---|
| Example 21 | 400 | Example 2 |
| Compar. ex. 13 | 800 | Compar. ex. 3 |

The results are shown in Table 6.

As apparent from Table 6, the block copolymer of the present invention afforded almost the same values of rigidity as those of the Comparative example in spite of the amount of talc added being half of that of the Comparative example.

What is claimed is:

1. A propylene-ethylene block copolymer for high-rigidity molded products, obtained by
   (i) polymerizing propylene in an amount of 70 to 95% by weight based on the total polymerized amount, in the presence of a catalyst obtained by reacting an organoaluminum compound (I) or a reaction product of an organoaluminum compound (I) with an electron donor (A), with TiCl$_4$(C), further reacting the resulting solid product (II) with an electron donor (A) and an electron acceptor (B), and combining the resulting solid product (III) with an organoaluminum compound (IV) and an aromatic carboxylic acid ester (V), the aromatic carboxylic acid ester (V) and the organoaluminum compound (IV) having not been previously reacted together prior to being combined with solid product (III), the molar ratio of said aromatic carboxylic acid ester (V) to said solid product (III) being in the range of 0.1 to 10.0, and then (ii) polymerizing ethylene or ethylene and propylene in an amount of 30 to 5% by weight based on the total polymerized amount, at one or more stages, in the presence of the same catalyst, as above, the ethylene content being in the range of 3 to 20% by weight based on the total polymerized amount.

2. A copolymer according to claim 1 wherein said organoaluminum compound (IV) is a dialkyl-aluminum monohalide.

3. A copolymer according to claim 1 wherein said aromatic carboxylic acid ester is at least one member selected from the group consisting of methyl p-toluylate, ethyl p-toluylate, butyl p-toluylate, methyl benzoate, ethyl benzoate, methyl p-anisate and ethyl p-anisate.

4. A copolymer according to claim 1 wherein said solid product (III) is combined with said organoaluminum compound (IV) and the resulting combination is preactivated with a small amount of an α-olefin and then combined with said aromatic carboxylic acid ester (V) to obtain a catalyst (VII) to be used for said polymerizations.

5. A copolymer according to claim 1 wherein the second et seq. stage copolymerization is carried out using a polymer mixture obtained at the first stage of the copolymerization, having a relationship of the isotactic pentad ratio (P) of polypropylene therein with its MFR, of $1.00 \geq P \geq 0.015 \log \text{MFR} + 0.955$.

6. A process for producing a propylene-ethylene block copolymer for high-rigidity molded products, which process comprises (i) polymerizing propylene in an amount of 70 to 95% by weight based on the total polymerized amount, in the presence of a catalyst obtained by reacting an organoaluminum compound (I) or a reaction product of an organoaluminum compound (I) with an electron donor (A), with $TiCl_4(C)$, further reacting the resulting solid product (II) with an electron donor (A) and an electron acceptor (B), and combining the resulting solid product (III) with an organoaluminum compound (IV) and an aromatic carboxylic acid ester (V), the aromatic carboxylic acid ester (V) and the organoaluminum compound (IV) having not been preivously reacted together prior to being combined with solid product (III), the molar ratio of said aromatic carboxylic acid ester (V) to said solid product (III) being in the range of 0.1 to 10.0, and then (ii) polymerizing ethylene or ethylene and propylene in an amount of 30 to 5% by weight based on the total polymerized amount, at one or more stages, in the presence of the same catalyst, as above, to obtain an ethylene content in the range of 3 to 20% by weight based on the total polymerized amount.

7. A process for producing a copolymer according to claim 6 wherein said organoaluminum compound (IV) is a dialkylaluminum monohalide.

8. A process for producing a copolymer according to claim 6 wherein said aromatic carboxylic acid ester is at least one member selected from the group consisting of methyl p-toluylate, ethyl p-toluylate, butyl p-toluylate, methyl benzoate, ethyl benzoate, methyl p-anisate and ethyl p-anisate.

9. A process for producing a copolymer according to claim 6 wherein said solid product (III) is combined with said organoaluminum compound (IV) and the resulting combination is preactivated with a small amount of an α-olefin and then combined with said aromatic carboxylic acid ester (V) to obtain a catalyst (VII) to be used for said polymerizations.

10. A process for producing a copolymer according to claim 6 wherein the second et seq. stage copolymerization is carried out using a polymer mixture obtained at the first stage of the copolymerization, having a relationship of the isotactic pentad ratio (P) of polypropylene therein with its MFR, of $1.00 \geq P \geq 0.015 \log \text{MFR.} + 0.955$.

* * * * *